United States Patent
Yuan et al.

(10) Patent No.: US 11,496,444 B1
(45) Date of Patent: Nov. 8, 2022

(54) ENFORCING ACCESS CONTROL TO RESOURCES OF AN INDEXING SYSTEM USING RESOURCE PATHS

(71) Applicant: Amazon Technologies, Inc., Seattle, WA (US)

(72) Inventors: Yong Yuan, Bellevue, WA (US); Saurabh Kumar Singh, Seattle, WA (US); Sachin Bangalore Raj, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 476 days.

(21) Appl. No.: 16/450,658

(22) Filed: Jun. 24, 2019

(51) Int. Cl.
*H04L 9/40* (2022.01)

(52) U.S. Cl.
CPC ...... *H04L 63/0245* (2013.01); *H04L 63/0263* (2013.01); *H04L 63/08* (2013.01); *H04L 63/101* (2013.01)

(58) Field of Classification Search
CPC . H04L 63/0245; H04L 63/0263; H04L 63/08; H04L 63/101
USPC .......................................................... 726/13
See application file for complete search history.

(56) References Cited

U.S. PATENT DOCUMENTS

| | | | | |
|---|---|---|---|---|
| 9,894,090 | B2* | 2/2018 | Hebert | H04L 63/1408 |
| 2007/0283425 | A1* | 12/2007 | Ture | G06F 21/6227 726/5 |
| 2014/0041053 | A1* | 2/2014 | Edwards | G06F 21/80 726/28 |
| 2020/0073974 | A1* | 3/2020 | Schretlen | G06F 16/2228 |

* cited by examiner

*Primary Examiner* — Benjamin A Kaplan
(74) *Attorney, Agent, or Firm* — Lee & Hayes, P.C.

(57) ABSTRACT

Technologies are disclosed for enforcing access control to resources of an indexing system using resource paths. Before performing a search for resources, access control is performed. By determining the resource paths that the user is authorized and/or unauthorized to access before performing the search, the search engine returns resources that the user is authorized to access instead of returning resources that the user may not be authorized to access. Before submitting a search query to a search engine an augmented search query is generated. The augmented search query includes one or more filter rules (which may be referred to herein as "filters") that specify the resource paths to include or exclude from the search. The augmented search query limits the search to resources that the user is authorized to access.

20 Claims, 7 Drawing Sheets

ENFORCING ACCESS CONTROL TO RESOURCES OF AN INDEXING SYSTEM USING RESOURCE PATHS

BACKGROUND

Search engines are commonly used to locate resources, such as documents, that match search terms provided by a user. Search engines may be used to locate resources on the World Wide Web (web), and/or within other data stores. For example, a search engine may be used by an enterprise to locate documents and/or other resources that are associated with an organization associated with that enterprise. When searching for resources, a search engine accesses one or more search indexes to locate resources identified in the indexes that match the search terms provided by the user.

In some cases, however, a user may not be authorized to access the identified resources. For instance, a user in one department of an organization may be authorized to access resources for that department but may not be authorized to access resources of another department. To prevent unauthorized access, an access control list (ACL), or some other mechanism, can be utilized. Generally, an ACL is a list of users and/or groups that are authorized or not authorized to access a particular resource. Before providing access to the search results, the resources to which the user is not authorized to access are excluded from the search results based on the ACL. In other cases, the search engine may access an ACL during the search to determine whether or not the user is authorized to access the resource. Utilizing an ACL to check each resource during a search can require can require a large number of computing resources, such as memory and processing resources. Further, enforcing and maintaining ACLs, can be challenging. For instance, when an ACL is updated, the resources affected by the update need to be re-ingested within the index. Consequently, implementing ACLs that are used by search engines can require significant effort, time, and computing resources.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
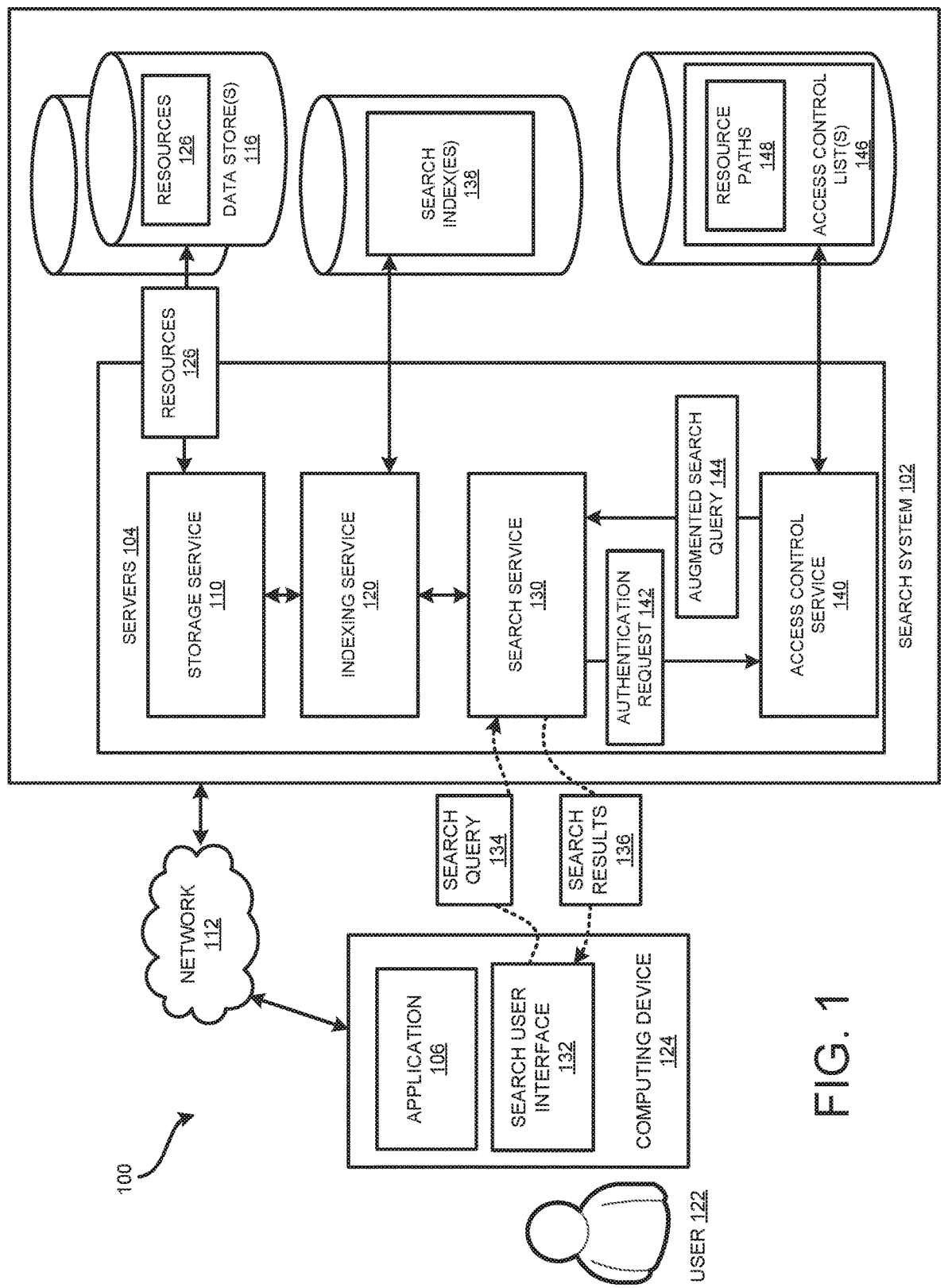
FIG. 1 is a software and network architecture diagram showing aspects of the configuration and utilization of a search system to enforce access control for resources in an indexing system using resource paths.

The following detailed description is directed to technologies for enforcing access control to resources of an indexing system using resource paths. Generally, a resource path identifies a location of one or more resources, such as documents. In some examples, a resource path may be a string of characters in which path components, separated by a delimiting character (e.g., a "/", "\", ";" . . . ), represent each directory. A resource path may be a path to a single resource (e.g., a document, an image, an application, or some other resource), or a path to many resources, such as to one or more directories containing resources. Utilizing technologies described herein, enforcing access control to resources can be performed before searching for resources. By determining the resource paths that the user is authorized and/or unauthorized to access before performing the search, the search engine returns resources that the user is authorized to access instead of returning resources that the user may not be authorized to access.

In some configurations, after receiving a search query from a user, the user is authenticated and the resource paths that the user is authorized and/or unauthorized to access are determined. According to some examples, an access control service accesses one or more Access Control Lists (ACLs) that specify the resource paths that the user is authorized and/or not authorized to access. In other examples, the access control service may access some other data source to determine authorized and/or unauthorized resource paths.

As discussed in more detail below, the resource paths that a user is authorized and/or unauthorized to access can be determined during ingestion of a document into a search index, or at some other point in time. For example, when documents are being indexed, the indexing process may update the authorized and/or unauthorized resource paths for users. In other examples, an authorized user (e.g., an administrator) may update the authorized and/or unauthorized resource paths. In some configurations, the authorized and/or unauthorized resource paths can be stored in an ACL, or some other data structure.

According to some examples, the resource paths associated with an ACL can include wildcard characters. For example, the asterisk character "*" character may be utilized to represent one or more characters in a resource path, a question mark character "?" may be utilized to represent a single character, and the like. Many other wildcards can be utilized.

In some configurations, the ACLs are stored separately from search indexes and are not linked to specific resources included within the search indexes. Stated another way, the resources identified within a search index do not reference an ACL. Since the ACLs are not linked with each resource within a search index and are stored separately from a search index, the ACLs can easily be changed without having to re-ingest resources into the search index.

Before submitting a search query to a search engine (which may also be referred to herein as a "search service"), an augmented search query is generated. The augmented search query includes one or more filter rules (which may be referred to herein as "filters") that specify the resource paths to include or exclude from the search that is performed by the search engine. As discussed briefly above, the resource paths that are associated with a user may be stored in one or more ACLs. The augmented search query can include the search terms provided by the user along with one or more filter rules that are used to limit the search to resources that the user is authorized to access. For instance, the filters for a first user that is authorized to access resources for a first department, but is not authorized to access resources of a second department, may include one or more read filters that specify resource paths to the resources of the first department, and/or one or more exclude filters that specify to exclude the resource paths to the non-authorized resources of the second department.

After adding the filters to the search terms provided by the user, the augmented search query can be provided to a search engine to locate the resources for which the user is authorized. Further, adding or removing a resource (such as a document) from a directory or location identified by a resource path may be done without also having to edit an ACL. For example, if one or more documents are added to a location that is an authorized resource path 148, then a search engine will return any newly added documents that match the search terms provided by a user. Search results can be presented in the user interface that identify the resources that the user is authorized to access. Additional details regarding the various components and processes described briefly above for enforcing access control to resources of an indexing system using resource paths will be presented below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, where tasks can be performed by remote computing devices that are linked through a communications network. In a distributed computing environment, program modules can be located in both local and remote storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the configuration and utilization of a search system to enforce access control for resources in an indexing system using resource paths. It is to be appreciated that the environment 100 is merely illustrative and that the various configurations disclosed herein can be utilized in many different types of computing environments.

To provide search service and the other functionality disclosed herein, the search system 102 may include one or more servers 104. The servers 104 can execute software components to provide the services described herein, including search functionality using resource path-based access control. The software components can execute on a single server 104 or in parallel across multiple servers in the search system 102. In addition, a software component can consist of subcomponents executing on different servers 104 or other computing devices in the search system 102. Various components can be implemented as software, hardware, or any combination of the two. In this regard, it is to be appreciated that the search system 102 shown in FIG. 1 has been simplified for discussion purposes and that many additional software and hardware components can be utilized.

A user 122 of the search system 102 can utilize a user computing device 124 to access the search system 102 through a network 112. The user 122 can be an individual that desires to locate resources 126 associated with the search system 102. In some examples, the user is a member of an enterprise and the resources 126 are resources associated with the enterprise. Generally, enterprise search includes allowing the members of the enterprise to search resources 126 from different enterprise sources, such as databases and intranets. Enterprise search systems may index resources from sources such as file systems, intranets, document management systems, message systems, databases, and the like.

The resources 126 can be different types of resources, such as but not limited to documents (e.g., electronic documents), applications, images, videos, and the like. In other examples, the user 122 may not be associated with an enterprise and the resources 126 may be resources associated with many different entities.

The user computing device 124 can be a smart phone, personal computer ("PC"), desktop workstation, laptop computer, tablet computer, notebook computer, personal digital assistants ("PDA"), electronic-book reader, game console, set-top box, consumer electronics device, server computer, voice-controlled device, or any other type of computing device capable of connecting to the network 112 and communicating with the search system 102.

The network 112 can be a local-area network ("LAN"), a wide-area network ("WAN"), the Internet, or any other networking topology known in the art that connects the user devices to the search system 102. The user 122 can use an application 106 executing on computing device 124 to access and utilize the search service functionality provided by the servers 104. In some examples, the application 106 is a web browser application, such as the AMAZON® SILK® web browser, or some other web browser. Generally, a web browser application exchanges data with the servers 104 in the search system 102 using the hypertext transfer protocol ("HTTP") over the network 112.

The client application might also be a stand-alone client application 106 configured for communicating with the servers 104. The client application 106 can also utilize any number of communication methods known in the art to communicate with the search system 102 and/or the servers 104 across the network 112, including remote procedure calls, SOAP-based web services, remote file access, proprietary client-server architectures, and the like. According to some configurations, the application 106 provides a search user interface 132 that can be utilized by the user 122 to enter a search query 134 that includes one or more search terms used to locate resources 126. The search user interface 132 may also be utilized to present search results 136. While a search UI 132 may be utilized in some examples, search queries and/or presenting search results may use other mechanisms. For instance, a search query 134 could be a voice command uttered by the user 122 and captured by one or more microphones of a device, such as a voice-controlled device. A voice service, or some other component (not illustrated) may process a corresponding audio signal associated with the audio data/voice command to determine words within the voice command (using automatic speech recognition techniques—ASR) and to determine an intent of the user (natural language processing techniques—NLU). Based on the identified words/intent, the voice service and/or component can determine the search query and output search results, which may be provided via a UI and presented on a display and/or audibly via one or more speakers associated with a device, such as a voice-controlled device.

According to some configurations, a storage service 110, an indexing service 120, a search service 130 (which may be referred to herein as a "search engine"), and an access control service 140 execute on the servers 104. The storage service 110 provides functionality for storing data, such as resources 126, in one or more data stores 116. In some configurations, resources 126 can be stored in locations that are remote from the search system 102. The search service 130 permits users, such as user 122, to search for resources associated with the search system 102.

Resources 126 associated with the search system 102 can be stored in one or more of the data stores 116, and/or some other data store (not shown). In examples disclosed herein, when a resource 126, such as a document, is received, the document is included within one or more search indexes 138. Generally, indexing enables resources 126 to be indexed for searching programmatically. Indexing is the process of associating information with a resource 126 (e.g., a tag) that can be used by a search engine to locate the resource. Resources 126 can be indexed using a variety of data, such as but not limited to a date, a type of resource, a location at which the resource is stored, a content of the resource, a source of the resource, a creator of the resource, and the like. For example, when a resource 126 is indexed using a resource path field, then a search query that includes a resource path would identify the resources that match the resource path.

The indexing service 120 can identify content associated with the resources 126 for inclusion in a search index 138. A search index 138 refers to structured data that a search engine, such as search service 130, accesses when identifying results that are relevant to a specific search query. As will also be discussed in greater detail below, the search index 138 can also be utilized to search the resources 126 available from an enterprise. For example, and without limitation, the search index 138 can be utilized to search documents in one or more document repositories associated with an enterprise.

In many cases, indexes are automatically generated and updated using software that determines how to index the resources 126. For example, and without limitation, text that is associated with a resource 126 can be identified. Other types of content such as graphical images can also be identified. Various types of processing can be performed on the graphical images to identify text associated with the images. For example, and without limitation, optical character recognition ("OCR") can be performed on the images to identify text contained therein. This text can then be added to the search index 138. As another example, image recognition can be performed on the images in order to identify content contained in the images. Text describing the identified content can then be added to the search index 138. Once the data to include within the search index 138 is identified, the indexing service 120 can store this information in the search index 138. More than one search index 138 may be generated by the indexing service 120 and/or utilized by the search service 130.

As briefly discussed above, a search user interface 132 can also be provided by the computing device 124 that provides functionality for searching. For example, and without limitation, a search query 134 can be received from a user, such as the user 122, that includes one or more search terms. In some configurations, the search query 134 is received by the search service 130.

In some examples, after receiving the search query 134 from the user 122, the user 122 may be authenticated and the resource paths 148 that the user is authorized to access, or is not authorized to access, are determined. According to some examples, the search service 130 transmits an authentication request 142 to an access control service 140 to authenticate the user 122 and to generate an augmented search query 144 that includes one or more filters to restrict searching to resource paths that the user 122 is authorized to access. For instance, a filter may include an identifier to include a resource path in the search, such as a "+", or some other identifier, and an identifier, such as a "−", or some other identifier, to exclude a particular resource path from a search. The identifier to include or exclude a path from the search may be followed by a resource path (e.g., "/organization/user/"). The one or more filters narrow the search performed by the search service 130 to specific locations. In this way, resources that the user is not authorized to access are not either searched or returned to the user. More details are provided below with reference to FIG. 2.

According to some configurations, before performing the search for resources that match the search terms specified by a user, the access control service 140 accesses one or more Access Control Lists (ACLs) 146 that specify the resource paths 148 that the user is authorized and/or not authorized to access. As discussed in more detail below, the resource paths 148 that a user is authorized to access can be determined during ingestion of a resource into a search index 138, or at some other point in time. According to some examples, the filters may specify full resource paths to a resource and/or the resource paths can include wildcard characters.

Since the ACLs 146 are not linked to specific resources included within the search indexes, and are stored separately from the search indexes, the ACLs 146 can easily be changed without having to re-ingest resources into the index. Further, as briefly discussed above, adding or removing a resource (such as a document) from a directory or location identified by a resource path 148 may be done without also having to edit the ACLs 146. For example, if one or more documents are added to a location that is an authorized resource path 148, then a search engine will return any newly added documents that match the search terms provided by a user.

After determining the resources paths 148 associated with the user 122, the access control service 140 generates one or more filters that indicate the allowed resource paths to search and/or the resource paths that are not authorized to be search. According to some examples, the filters are the resource paths 148 associated with the user 122 along with an indication of whether the user is authorized to access resources within the resource path 148 or is unauthorized to access the resources within the resource path 148. In some configurations, the access control service 140 generates the augmented search query 144 to include the determined resource paths and the search terms provided by the user in the search query 134.

In some configurations, the augmented search query 144 is generated by adding the one or more filters indicating the resource paths to search and/or to exclude from the search along with the search terms included within the search query 134. In other configurations, the augmented search query 144 may be generated based on the search terms in the search query 134. For example, the access control service 140 and/or the search service 130 may generate one or more additional search terms to supplement and/or clarify the search terms provided by the user within the search query 134. Stated another way, the access control service 140, the search service 130, or some other component may enrich the search query 134 such that additional search results 136 may be obtained to match the intent of the search query 134 provided by a user.

Upon receiving the augmented search query 144, the search service 130 can perform a search in the locations as specified by the augmented search query 144. Since the augmented search query 144 includes the filters, the search can be restricted to locations that the user is authorized to access. Search results 136 can be presented in the user interface 132 or provided using some other device (e.g., a voice-controlled device) that identify the resources 126 that the user is authorized to access. If a user selects one of the search results, the associated resource 114 can be accessed. Additional details regarding the various processes described above with regard to FIG. 1 will be provided below with regard to FIGS. 2-7.

Figure 2:
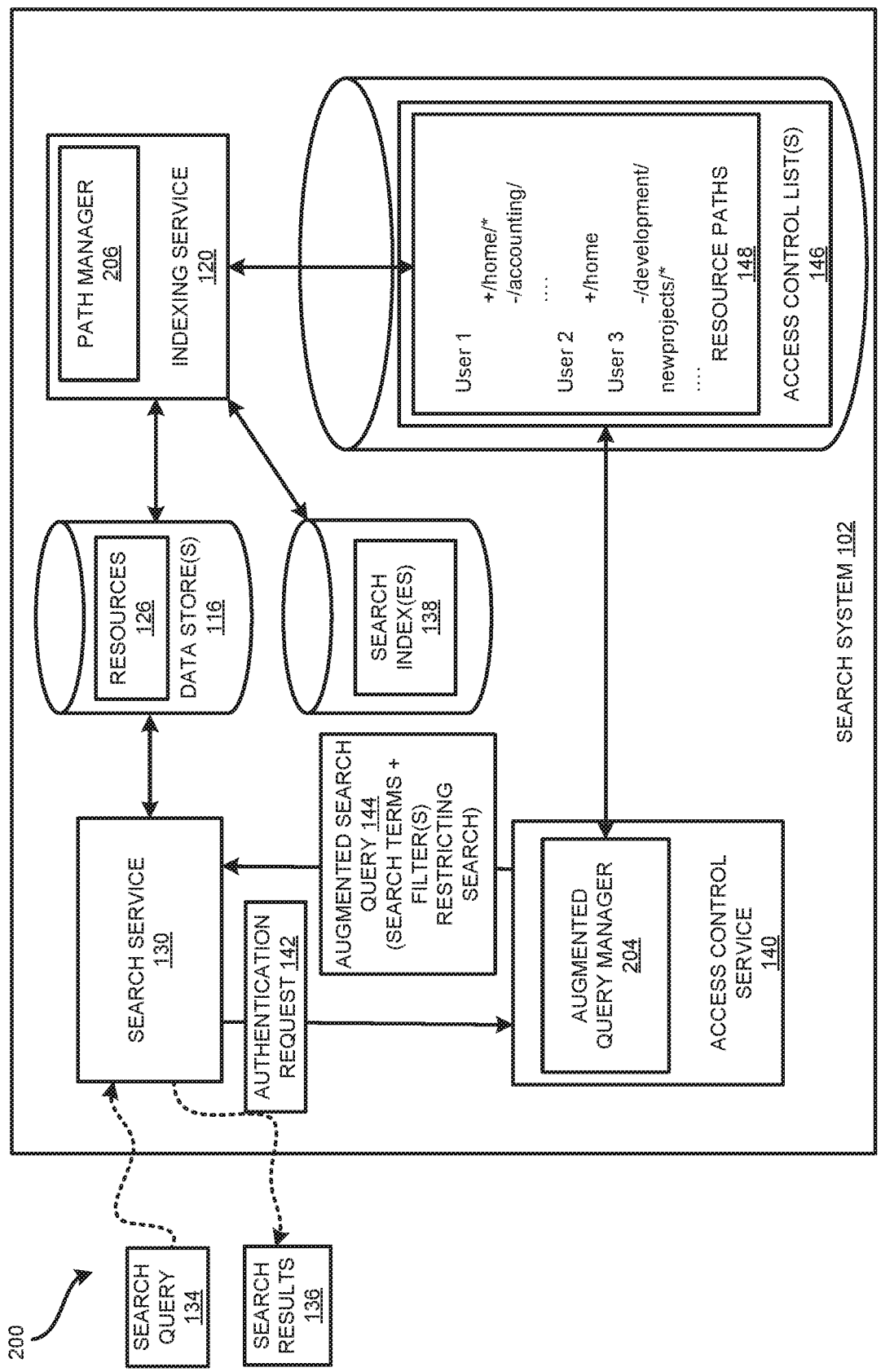
FIG. 2 is a software and network architecture diagram showing aspects of an access control service to generate augmented search queries to be utilized by a search service to locate resources a user is authorized to access.

FIG. 2 is a software and network architecture diagram showing aspects of an access control service 140 to generate augmented search queries 144 to be utilized by a search service 130 to locate resources a user is authorized to access. It is to be appreciated that the environment 200 is merely illustrative and that the various configurations disclosed herein can be utilized in many different types of computing environments. FIG. 2 is similar to FIG. 1 but provides more details regarding the indexing service 120, and the access control service 140.

As illustrated, access control service 140 includes an augmented query manager 204 that can be utilized to generate an augmented search query 144 that includes the filter(s) to restrict the search by the search service 130 to the resources 126 the user 122 is authorized to access. In the current example, the augmented query manager 206 may be configured to determine the filter(s) to add to the search terms provided by the user associated with the search query 134. As illustrated, the augmented query manager 204 accesses access control list(s) 146 to identify the resource paths 148 associated the user who submitted the search query 134.

According to some configurations, the ACLs 146 include a list of the resource paths 148 that the user is authorized and/or unauthorized to access. As discussed above, a resource path identifies a location of one or more resources. A resource path 148 may be an absolute path that includes a full path to the resource, or a relative path (to a known location) that provides a partial path to a resource. For instance, a relative path may be a resource path starting from a home directory of a user, a location of files for a particular application, and the like. Many different resource paths can be utilized using techniques described herein. For example, Network File System (NFS) path name identifies a file system exported by a remote NFS server, a Bite File System (BFS) path specifying the directories leading to the object, an S3 path that may be an absolute path or relative path. S3Uri: represents the location of a S3 object, prefix, or bucket, Common Internet File System (CIFS) path, Server Message Block (SMB) path, a Uniform Resource Locator (URL) path, or a Uniform Resource Identifier (URI), and the like.

In some examples, a particular filter for a resource path may include an identifier to include a resource path in the search, such as a "+", or some other identifier, and an identifier, such as a "−", or some other identifier, to exclude a particular resource path from a search. Other indicators can be utilized. Further, while the filters can include both resource paths 148 that can be included and excluded from a search, the filters may include just the resource paths that can be accessed, or the filters can include just the resource paths that the user is not authorized to access. As illustrated, the filters include "User 1—"+/home/*"" and "−/accounting/", User 2 includes "+/home", User 3 includes "−/development/newprojects/*", and so on. In some examples, the augmented query manager 204 generates the augmented search query 144 to include the resource paths 148 associated with the user 122 and the search terms provided by the user 122 in the search query 134.

As discussed briefly above, the indexing service 120 and/or some other service, such as the access control service 140, or some other component, can determine the authorized/non-authorized paths during indexing of the resources, and/or at some other time. For example, the indexing service 120 may include a path manager 206 that may determine the resource paths 148 that the user is authorized to access and/or not authorized to access as resources are indexed. Generally, the path manager 206 may index the resources and preserve the resource path based meta information in the indexed resource. Further, in some configurations, in contrast to other search systems, the meta information that is indexed and/or content of the resource is not utilized during the time of a search to enforce access control.

In some configurations, the path manager 206 may access data associated with a particular resource and/or a data store to identify the resources paths for a particular user. For instance, some data may include separate ACLs that can be accessed by the path manager 206 to determine whether or not a user is authorized to access that resource or group of resources. The indexing service 120 may index resources 126 from a variety of locations, such as but not limited to data stores 116, intranets, document management systems, message systems, databases, file sharing services, and the like. Further, the indexing service 120 may also index different file types, such as but not limited to Portable Document Format (PDF), Hyper Text Markup Language (HTML), document file formats (e.g., doc), and the like. According to some examples, the indexing service 120 may be provided using the AMAZON Elastic search® Service.

In some configurations, the indexing service 120, or some other component or service, may provide an ingestion service that may automatically pull resources from data sources (e.g., the data sources of an enterprise), as well as allow a user to push resources into the indexing service 120 for ingestion. In some configurations, the indexing service 120 may crawl the resources associated with the enterprise to determine the resources to ingest. In other examples, one or more application programming interfaces (API) (not shown) may be utilized by a user to provide resources, such as documents, to the indexing service 120 for ingestion.

In other examples, an authorized user, such as an administrator, may update the resource paths 148 in the ACLs 146. For instance, the user may add and/or remove resource paths 148 used to determine the filter rules directly within the ACLs 146. Since the ACLs 146 are not tied directly to a resource 126, the search index associated with a particular resource does not need to be re-generated when changes are made to the ACLs 146. Similarly, when a resource is added, and the indexing service 120 ingests the resource, the path manager 206 may update the ACLs 146 if needed. As discussed above, after adding the filters to the search query, the augmented query manager 204 provides the augmented search query 144 to the search service 130 for performing the search for the resources 126 that match the search terms of the search query 134. In some configurations, the search service 130 is a multi-tenant service that provides search services for different enterprises. Generally, each of the different enterprises can be associated with different resources 126, different ACLs 146, and the like.

As an example, when a resource 126, such as a document is indexed, the indexing service 120 accesses may extract text from the resource 126, analyze the text to identify tags to associate with the resource 126, and determine the permissions associated with the resource 126. For example, when a resource 126 is being indexed, the indexing service 120 may access an ACL associated with a resource 126 to determine the users that are authorized to access or not authorized to access the resource 126. Instead of storing the permission information within a search index 138, the indexing service 120 stores a separate resource path 148 list, such as within ACL 146, that provides the locations of resources 126 that the user is authorized and/or not authorized to access. As a result, the search service 130 can save a significant amount of computing resources when searching for resources 126 since the search service 130 does not need to determine whether a user is authorized to view a matching resource 126. Generally, any resource that is stored at an authorized location will be included in the search performed by the search service 130.

Figure 3:
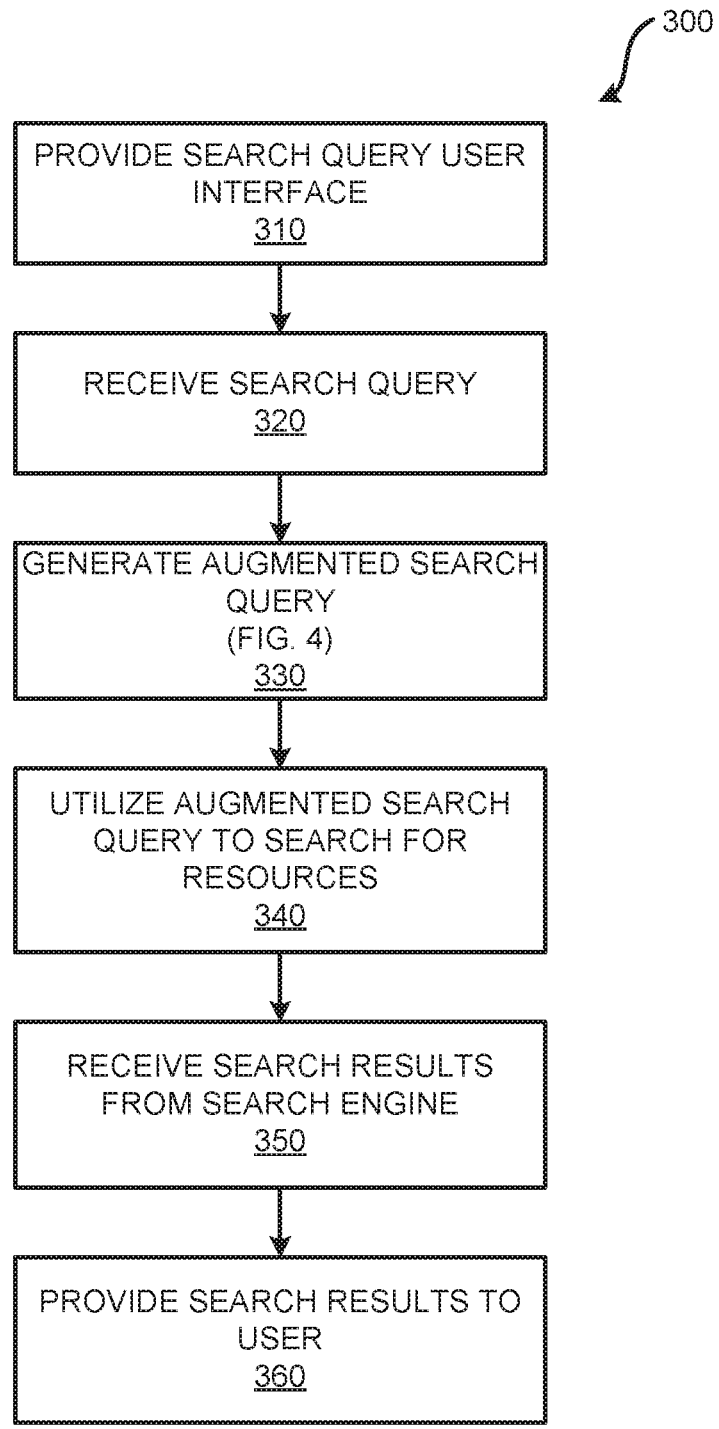
FIG. 3 is a flow diagram showing an illustrative routine for enforcing access control for resources in an indexing system using resource paths.

FIG. 3 is a flow diagram showing an illustrative routine 300 for enforcing access control for resources in an indexing system using resource paths 148, according to examples disclosed herein. It should be appreciated that the logical operations described herein with respect to FIG. 3, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 300 begins at 310, where the computing device 124 provides a search query UI 132. As discussed above, the search query UI 132 can be provided by an application, an operating system executing on the computing device 124, or another component. For example, a web-based UI can be provided for submitting a search query 134 to the search service 130. In other embodiments, the search system 102 may cause a computing device 124 of the user 122 to audibly output audio data prompting the user 122 to provide the search query 134. For instance, via one or more speakers of the computing device 124, the search system 102 may cause the computing device 124 to audibly output, "please enter a search query," or something similar.

At 320, a search query 134 is received. As discussed above, the search query 134 includes one or more search terms provided by a user 122 that are used by a search service 130 to locate resources 126. In some examples, the search query 134 is received from a user of an enterprise to locate resources 126 associated with the enterprise. In other examples, the resources 126 may be associated with other entities. The search query 134 may be input by the user 122 via a user interface presented via a display of the computing device 124. In other embodiments, the search query 134 may be provided via a voice command audibly uttered by the user 122, which is captured by one or more microphones of the computing device 124. Regardless of how the search query 134 is provided by the user 122, the computing device 124 and/or the search system 102 may process the search query 134, possibly using one or more speech recognition techniques (ASR) or one or more natural language processing techniques (NLU) in order to determine an intent associated with the search query 134.

At 330, an augmented search query 144 is generated. As discussed above, an access control service 140, or some other component, generates the augmented search query 144 based on the resource paths 148 the user is authorized and/or unauthorized to access. Generally, the access control service 140 generates the augmented search query 144 based on the resource paths 148 that are identified within an ACL 146. The augmented search query 144 may include the received search terms along with the filters that indicates the resource paths 148 that should be included within the search and/or excluded from the search. More details are provided below with regard to FIG. 4.

At 340, the augmented search query 144 is utilized to search for resources. As discussed above, the search service 130 uses the filters included in the augmented search query 144 to search for the resources 126 that match the search terms included in the search query 134. Instead of locating all of the results that match the search terms within the search query 134 and then removing the resources 126 that the user is not authorized to access, the search is performed by the search service 130 in authorized locations associated with the user.

At 350, the search results 136 are received from the search service 130. As discussed above, the search results 136 include the resources 126 that the user requesting the search is authorized to access.

At 360, the search results 136 are provided to the user. As discussed above, the search results 136 can be presented within a UI, such as the search UI 132, or provided using some other mechanism. For instance, the search results 136 may be audibly output via one or more speakers of the computing device 124 of the user 122. In some examples, the user 122 can utilize the search UI 132 to select one of the search results 136. The user 122 may also select one of the search results 136 using via a voice command that is captured by one or more microphones of the computing device 124. Responsive thereto, the application 106 can provide additional information about the selected resource 126.

Figure 4:
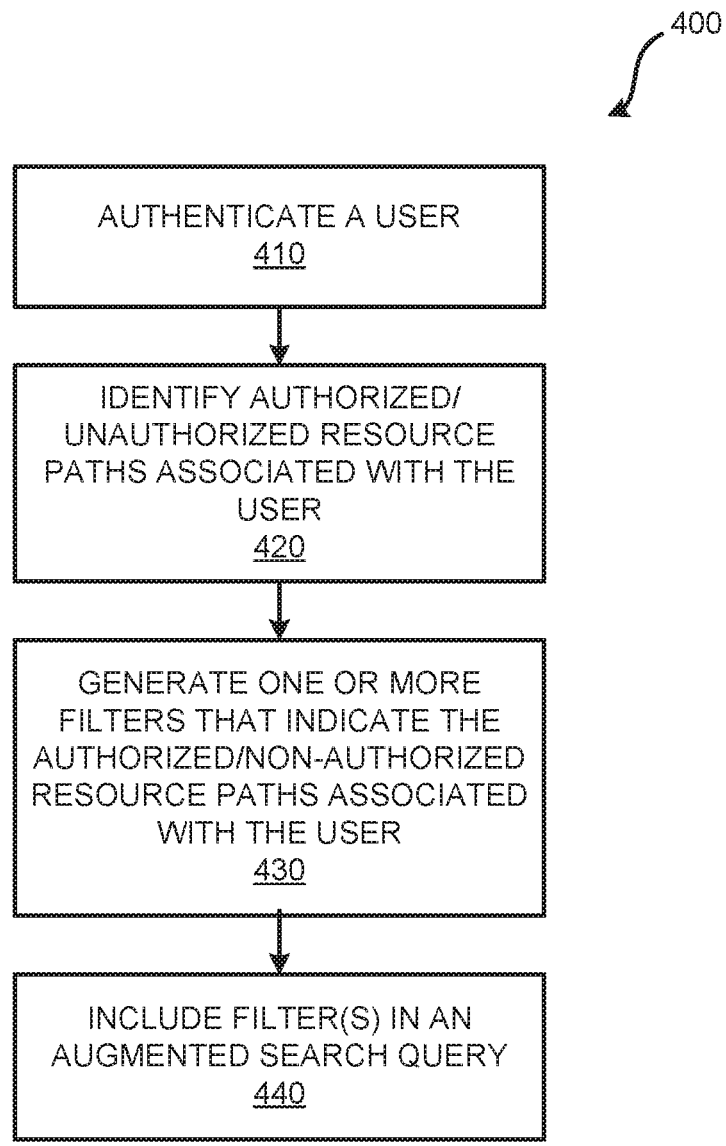
FIG. 4 is a flow diagram showing an illustrative routine for generating an augmented search query using resource paths.

FIG. 4 is a flow diagram showing an illustrative routine 400 for generating an augmented search query 144 using resource paths 148, according to examples disclosed herein. The routine 400 begins at 410, where the user may be authenticated. As discussed above, the authentication may involve different procedures. In some configurations, the user 122 can be requested to provide information that is used to verify the identity of the user. In other configurations, the authentication may involve other techniques. For instance, determining that the computing device transmitting the search query 134 is an authorized device. In some examples, the user 122 may have previously been authenticated, and this operation may be bypassed.

At 420, the authorized and/or unauthorized resource paths 148 associated with the user 122 are identified. As discussed above, the access control service 140, or some other component or service, can access one or more ACLs 146 to determine the resource paths 148 that the user 126 is authorized and/or not authorized to access. In some configurations, the ACLs 146 can be stored in a database, or some other data store that is separate from the search indexes.

At 430, one or more filters are generated that indicate the authorized/non-authorized resource paths 148 that are associated with the user. As discussed above, the filters can include one or more resource paths 146 that indicate the resource paths that the user is authorized to access (e.g., view/edit . . . ) and/or one or more resource paths that the user is not authorized to access.

At 440, the filters determined at 430 are included with the search terms of the search query 134 to generate the augmented search query 144. As discussed above, the filters are added to the search terms of the received search query 134 before the search for resources 126 is performed by the search service 130.

Figure 5:
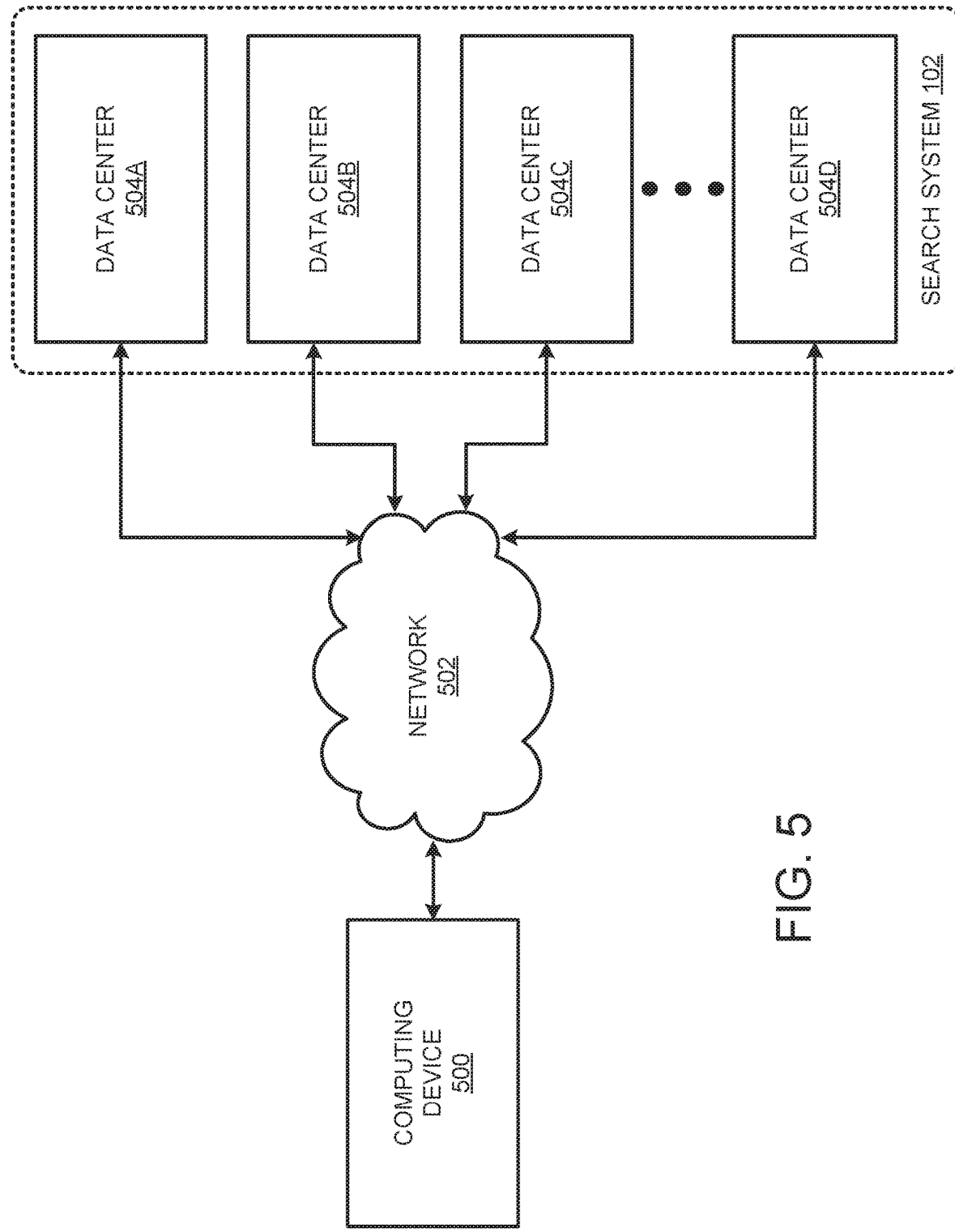
FIG. 5 is a system and network diagram that shows an illustrative operating environment including several data centers that can be configured to implement aspects of the functionality described herein.

FIG. 5 is a system and network diagram that shows one illustrative operating environment for the configurations disclosed herein that includes a search system 102 that can be configured to provide the functionality described above. As discussed above, the search system 102 can execute network services that provide computing resources for implementing the functionality disclosed herein. The computing resources implemented by the search system 102 can be data processing resources, such as virtual machine ("VM") instances, data storage resources, networking resources, data communication resources, network services, and other types of resources.

The computing resources provided by the search system 102 can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The search system 102 can also include and utilize other types of computing resources not mentioned specifically herein.

As also discussed above, the computing resources provided by the search system 102 are enabled in one implementation by one or more data centers 504A-504D (which might be referred to herein singularly as "a data center 504" or collectively as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative configuration for a data center 504 that can be utilized to implement the technologies disclosed herein will be described below with regard to FIG. 6.

The users can access the services provided by the search system 102 over a network 502, which can be a wide area communication network ("WAN"), such as the Internet, an intranet or an Internet service provider ("ISP") network or a combination of such networks. For example, and without limitation, a computing device 500 operated by a user or other user of the search system 102, such as the computing device 124, can be utilized to access the search system 102 by way of the network 502. It should be appreciated that a local-area network ("LAN"), the Internet, or any other networking topology known in the art that connects the data centers 504 to remote users and other users can be utilized. It should also be appreciated that combinations of such networks can also be utilized.

Figure 6:
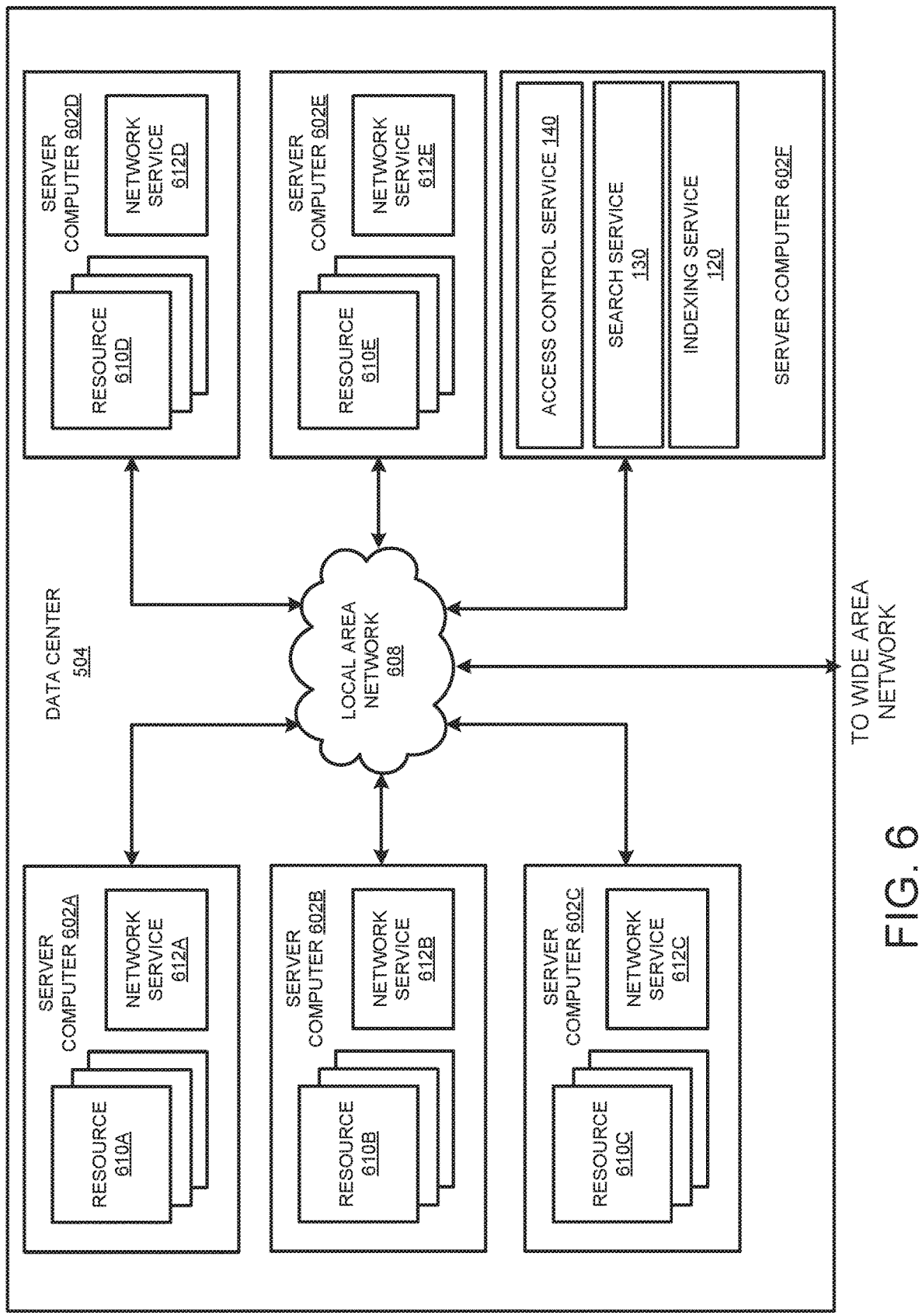
FIG. 6 is a computing system diagram illustrating a configuration for a data center that can be utilized to implement aspects of the technologies disclosed herein.

FIG. 6 is a computing system diagram that illustrates examples for a data center 504 that can be utilized to implement the storage service 110, the indexing service 120, the search service 130, the access control service 140, and the other functionality disclosed herein. The example data center 504 shown in FIG. 6 includes several server computers 602A-602F (which might be referred to herein singularly as "a server computer 602" or in the plural as "the server computers 602").

The server computers 602 can be standard tower, rack-mount, or blade server computers configured appropriately for providing various types of computing resources 610 for implementing the functionality disclosed herein. As mentioned above, the computing resources 610 provided by the data center 504 can be data processing resources such as VM instances or hardware computing systems, data storage resources, database resources, networking resources, and others. Some of the servers 602 can also be configured to execute network services 612A-612-E, respectively, capable of instantiating, providing and/or managing the computing resources 610A-610E.

The data center 504 shown in FIG. 6 also includes a server computer 602F that can execute some or all of the software components described above. For example, and without limitation, the server computer 602F can be configured to execute the indexing service 120, the search service 130, the access control service 140, which have been described in detail above. The server computer 602F can also be configured to execute other components and/or to store data for providing some or all of the functionality described herein. In this regard, it should be appreciated that components or different instances of the services can execute on many other physical or virtual servers in the data centers 504 in various configurations.

In the example data center 504 shown in FIG. 6, an appropriate LAN 608 is also utilized to interconnect the server computers 602A-602F. The LAN 608 is also connected to the network 502 illustrated in FIG. 5. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504D, between each of the server computers 602A-602F in each data center 504, and, potentially, between computing resources 610 in each of the data centers 504. It should be appreciated that the configuration of the data center 504 described with reference to FIG. 6 is merely illustrative and that other implementations can be utilized.

Figure 7:
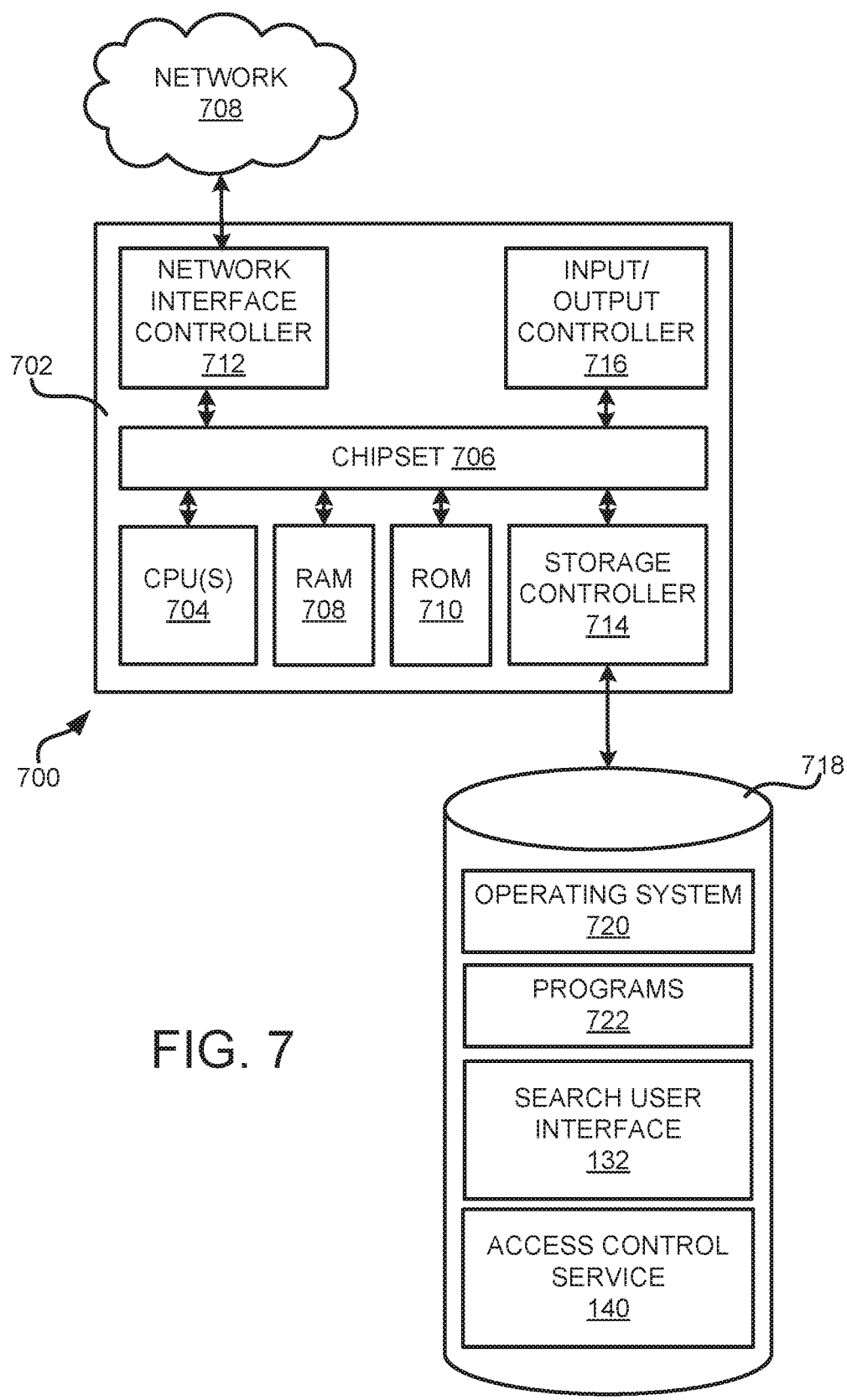
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, search user interface 132, access control service 140, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 718 can store other system or application programs and data utilized by the computer 700.

In examples, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to examples, the computer 700 has access to computer-readable storage media storing computer-executable instructions which, when executed by the computer 700, perform the various processes described above with regard to FIGS. 1-4. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or can utilize an architecture completely different than that shown in FIG. 7.

Based on the foregoing, it should be appreciated that technologies for enforcing access control to resources of an indexing system using resource paths have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
   one or more processors; and
   a non-transitory computer-readable storage medium having instructions stored thereupon which, when executed by the one or more processors, cause the system to:
   receive, from a computing device associated with a user, a search query comprising one or more search terms;
   identify one or more resource paths that include one or more authorized resource paths or one or more unauthorized resource paths, wherein the one or more authorized resource paths identify one or more first locations at which one or more first resources that the user is authorized to access are stored, and the one or more unauthorized resource paths identify one or more second locations at which one or more second resources that the user is unauthorized to access are stored;
   generate, based at least in part on the one or more resource paths, one or more filter rules that restrict a search performed by a search engine to the one or more authorized resource paths;
   generate an augmented search query, where generating the augmented search query includes adding the one or more filter rules to the one or more search terms;
   provide the augmented search query to the search engine that accesses one or more search indexes to locate one or more third resources, wherein the one or more search indexes include one or more fourth resources that are unlinked from the one or more authorized resource paths, wherein the one or more search indexes identify at least one resource of the one or more fourth resources that the user is authorized to access or unauthorized to access;
   receive search results from the search engine, wherein the search results include the one or more third resources that the user is authorized to access; and
   provide the search results to the computing device.

2. The system of claim 1, wherein identifying the one or more resource paths includes accessing one or more Access Control Lists (ACLs) to determine the one or more resource paths associated with the user, wherein the one or more ACLs include a list of one or more of the authorized resource paths or the unauthorized resource paths.

3. The system of claim 1, wherein the instructions further cause the system to:
   ingest resources of an enterprise;
   generate a search index that includes the resources; and
   generate data that is included in one or more ACLs that indicates one or more of authorized resource paths or unauthorized resource paths associated with users of the enterprise, wherein the one or more ACLs are stored separately from the search index.

4. The system of claim 1, wherein the instructions further cause the system to authenticate the user for an enterprise, and wherein identifying the one or more resource paths is based, at least in part, on data identified from authenticating the user, and wherein the search engine is configured to search one or more data stores associated with the enterprise for the one or more third resources that the user is authorized to access.

5. The system of claim 3, wherein the instructions further cause the system to update at least one of the one or more ACLs without updating the search index.

6. A computer-implemented method, comprising:
   receiving, at a computing device associated with a search system, a search query comprising one or more search terms;
   generating an augmented search query that includes at least a portion of the one or more search terms and data that indicates one or more resource paths, wherein the one or more resource paths include one or more authorized resource paths that identify one or more locations that a user is authorized to access or unauthorized to access;
   providing the augmented search query to one or more search engines that access one or more search indexes to locate one or more first resources, wherein the one or more search indexes include one or more second resources that are unlinked from the one or more authorized resource paths, wherein the one or more search indexes identify at least one resource of the one or more second resources that the user is authorized to access or unauthorized to access, and wherein the augmented search query restricts a search performed by at least one of the one or more search engines to the one or more authorized resource paths and the at least one resource;

receiving, from the one or more search engines, one or more search results that identify the one or more first resources that the user is authorized to access; and providing, to the computing device, at least a portion of the one or more search results.

7. The computer-implemented method of claim 6, further comprising determining the one or more resource paths, wherein determining the one or more resource paths includes accessing one or more Access Control Lists (ACLs) that are stored separately from a search index utilized by the one or more search engines.

8. The computer-implemented method of claim 7, further comprising generating at least one of the one or more ACLs based at least in part on authorization data determined from indexing the one or more first resources.

9. The computer-implemented method of claim 7, wherein at least one of the one or more ACLs includes a list of users and associated resource path permissions, wherein the users are associated with an enterprise.

10. The computer-implemented method of claim 6, further comprising authenticating the user and wherein the one or more resource paths are based at least in part data identified during authenticating the user.

11. The computer-implemented method of claim 6, wherein generating the augmented search query includes generating one or more filters based at least in part on authorization data that indicates the one or more resource paths that restrict a search performed by the one or more search engines to the one or more authorized resource paths, and wherein the data includes the one or more filters.

12. The computer-implemented method of claim 6, further comprising:
ingesting resources of an enterprise; and
identifying, based at least in part on ingesting the resources of the enterprise, the one or more resource paths.

13. The computer-implemented method of claim 6, further comprising:
generating a search index that includes the one or more first resources; and
storing the search index separately from the one or more ACLs.

14. A non-transitory computer-readable storage medium having instructions stored thereupon that are executable by a processor and which, when executed, cause the processor to:
receive, from a computing device associated with a user, a search query comprising one or more search terms;
identify one or more resource paths, wherein the one or more resource paths include one or more locations that the user is authorized to access or is unauthorized to access, wherein one or more search indexes include one or more first resources that are unlinked from the one or more locations that the user is authorized to access and one or more second resources that are unlinked from the one or more locations that the user is unauthorized to access, wherein the one or more search indexes identify at least one first resource of the one or more first resources and at least one second resource of the one or more second resources that the user is authorized to access or unauthorized to access;
generate an augmented search query that includes data identifying at least one of the one or more resource paths;
cause a search to be performed using the augmented search query and at least one of the one or more search indexes, wherein the search is restricted to (i) the one or more locations that the user is authorized to access, (ii) the one or more first resources that the user is authorized to access, and (iii) the one or more second resources that the user is authorized to access; and
provide one or more search results associated with the search to the computing device.

15. The non-transitory computer-readable storage medium of claim 14, wherein causing the search to be performed comprises:
providing the augmented search query to a search engine; and
receiving the one or more search results from the search engine.

16. The non-transitory computer-readable storage medium of claim 15, wherein the search engine is configured to search one or more data stores associated with an enterprise.

17. The non-transitory computer-readable storage medium of claim 14, wherein identifying the one or more resource paths includes accessing one or more Access Control Lists (ACLs) to determine the one or more resource paths associated with the user.

18. The non-transitory computer-readable storage medium of claim 14, wherein the instructions further cause the processor to authenticate the user; and wherein identifying the one or more resource paths is based at least in part on data associated with authenticating the user.

19. The non-transitory computer-readable storage medium of claim 15, wherein the non-transitory computer-readable storage medium has further instructions stored thereupon that cause the processor to:
ingest resources of an enterprise; and
generate a search index utilized by the search engine that includes the resources of the enterprise; and
generate an ACL that identifies the one or more resource paths, wherein the search index is stored separately from the ACL.

20. The non-transitory computer-readable storage medium of claim 19, wherein the non-transitory computer-readable storage medium has further instructions stored thereupon that cause the processor to update one or more of the ACLs without updating the search index.

* * * * *